June 1, 1965  H. A. MEAD ETAL  3,186,625
BAGS FOR MILK AND THE LIKE
Original Filed June 26, 1961  2 Sheets-Sheet 1

INVENTORS.
HARRY A. MEAD
BY LAMONT SLAGEL
Horace B. Van Valkenburgh
ATTORNEY

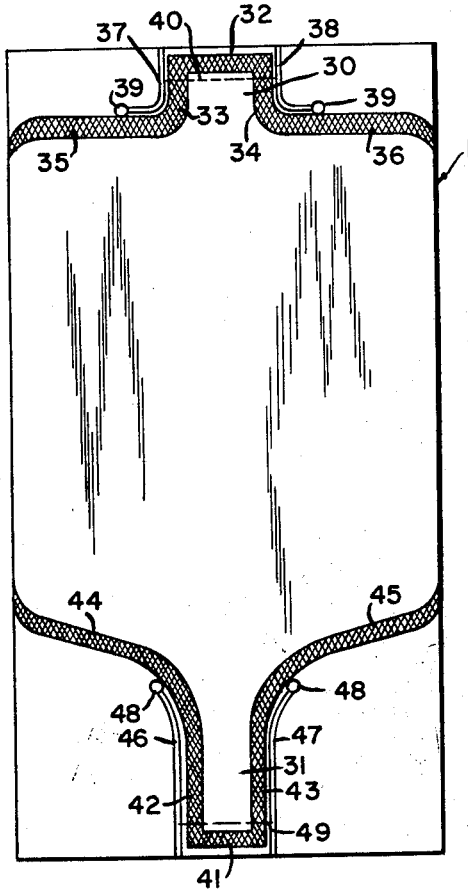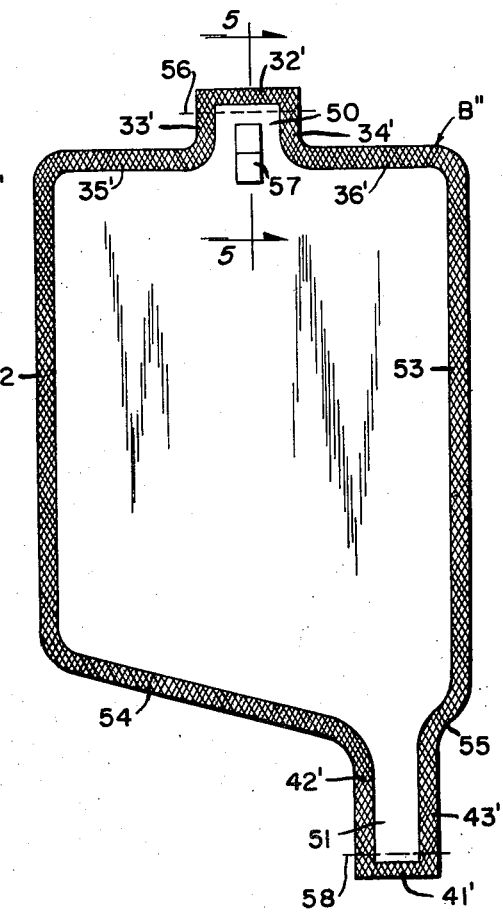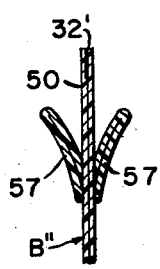

United States Patent Office 3,186,625
Patented June 1, 1965

3,186,625
BAGS FOR MILK AND THE LIKE
Harry A. Mead, Lakewood, Colo. (10060 W. 8th Place, Denver, Colo.), and Lamont Slagel, 6855 S. Adams Way, Littleton, Colo.
Continuation of application Ser. No. 119,732, June 26, 1961. This application July 6, 1964, Ser. No. 386,103
8 Claims. (Cl. 229—53)

This invention relates to bags for milk and other liquids, formed of flexible or pliable, heat sealable materials, particularly a plastic, such as polyethylene. This application is a continuation of our application Serial No. 119,732, filed June 26, 1961, in turn a continuation-in-part of our application Serial No. 810,454, filed May 1, 1959, now U.S. Patent 2,990,101, which in turn was a continuation-in-part of our application Serial No. 721,961, filed March 17, 1958, copending therewith but now abandoned.

Liquids such as milk have conventionally been shipped and stored in metal cans, but such cans are heavy and require reshipment from the point of use of milk to the point of filling. The point of use of the milk may be the ultimate point of use, or the point at which the milk is transferred to smaller containers, the latter for sanitary reasons. In addition each can must be thoroughly sterilized before it is used again, such sterilization being time-consuming and often inconvenient.

Among the objects of the present invention are to provide a novel bag for milk or other liquids; to provide such a bag which may be readily filled, stored and shipped; to provide such a bag which may be made in a convenient form for use; to provide such a bag which may be made of a sufficiently inexpensive material that it may be discarded after one use; to provide such a bag which may be filled and emptied without undue difficulty; to provide a bag which is filled through one spout and emptied through another spout; to provide such a bag which may be used for dispensing milk or other liquids; to provide such a bag which will be efficient and effective in use; to provide a series of such bags in a form which may be readily stored and handled; to provide such a bag which may exist in a plurality of forms; and to provide such bags which may be easily and economically manufactured.

Additional objects and the novel features of this invention will become apparent from the description which follows, taken in conjunction with the accompanying drawings, in which:

FIG. 3 is a plan view, similar to FIG. 2, but on a reduced scale, of an alternative bag after removal from the strip;

FIG. 4 is a plan view, showing a further alternative bag of this invention; and

FIG. 5 is a vertical, enlarged section, taken along line 5—5 of FIG. 4, showing tabs which assist in opening a filling spout.

Figures 1, 2:
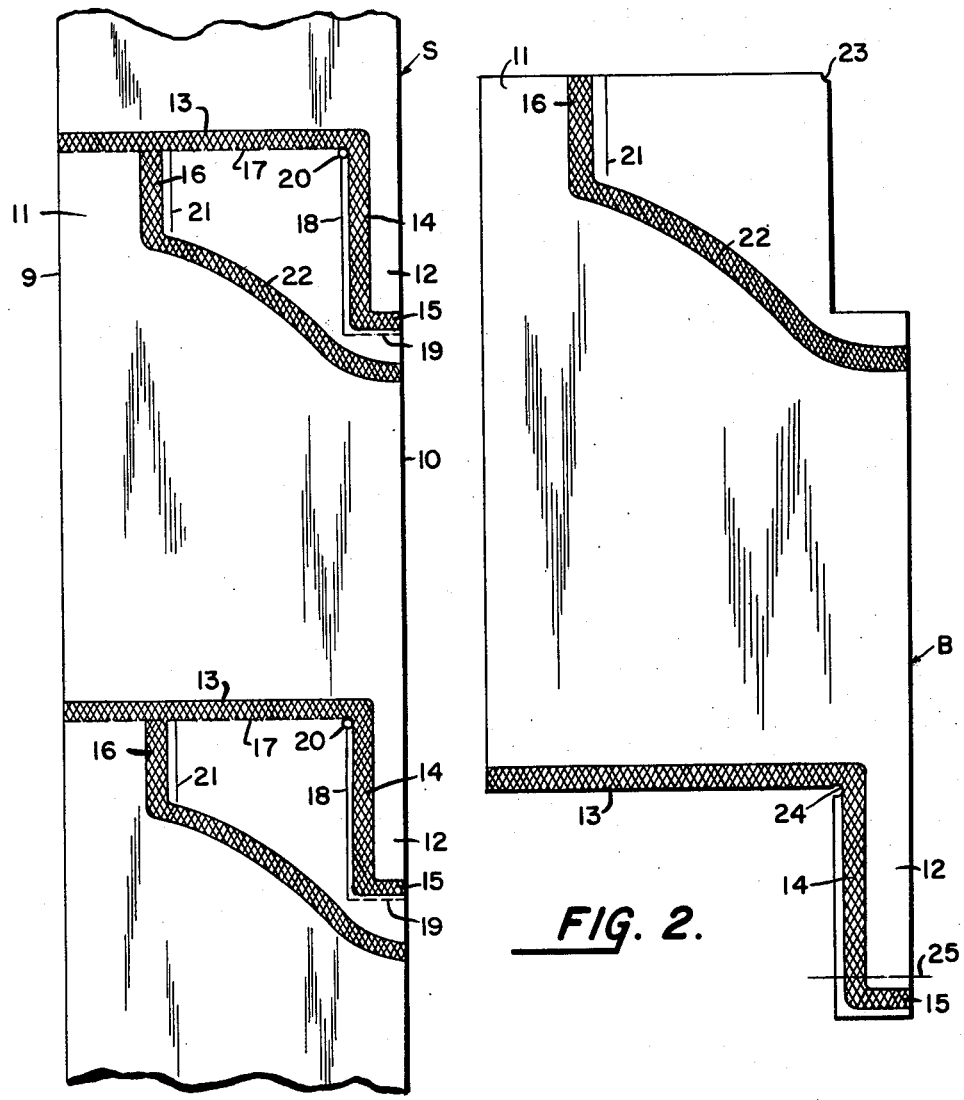
FIG. 1 is a top plan view of a portion of a flattened tubular strip, illustrating the manner in which a series of bags constructed in accordance with this invention may be produced.
FIG. 2 is a side elevation, on a slightly enlarged scale, of a bag after removal from the strip of FIG. 1.

In accordance with this invention, a series of bags for milk and the like, as in FIG. 1, may be produced from a flattened tubular strip S of a suitable flexible plastic, such as polyethylene, as by heat sealing and partially separating at spaced positions along the strip. The individual bags, such as the bag B of FIG. 2, conveniently remain with the strip S until separated therefrom. Edges 9 and 10 of strip S are integral with the sides when strip S is a flattened, tubular strip, although it will be understood that strip S may be formed from a sheet folded over along the center, so as to be integral at one edge and the side walls heat sealed along the opposite edge. Or, the side walls at both edges 9 and 10 may be attached together by heat seals.

Bag B, as in FIG. 2, has a normally open filling spout 11, disposed at the upper end of the bag, and a normally closed pouring spout 12, located at the bottom of the bag and extending longitudinally from the bottom of the bag, conveniently at one edge. To produce a series of the bag B, a series of heat seals may be produced in spaced positions along the strip S of FIG. 1, such series of heat seals including a transversely extending heat seal 13, which extends from edge 9 across the strip to a point spaced from the opposite edge 10 and is integral with a longitudinally extending heat seal section 14, which extends in spaced relation to edge 10, to form one boundary of pouring spout 12 of a bag B. The end of the pouring spout may be closed by a transverse heat seal section 15, which seals the walls of the strip together between the end of heat seal section 14 and the adjacent edge 10 of the bag. A longitudinal heat seal section 16, spaced from edge 9 of the bag, so as to form one boundary of filling spout 11, may be integral with heat seal section 13, or may be spaced slightly therefrom, on the opposite side of a series of cuts or perforations 17, which extend from the edge 9 of the bag to a point adjacent heat seal section 14. A slot 18 may extend alongside the heat seal section 14 and may be provided at its lower end with a corner extension, with a series of slots or perforations 19 being spaced from the corner extension and extending transversely to edge 10 adjacent heat seal section 15. As will be evident, slots 18 and 19, when serving is completed, provide the pouring spout 12 of bag B. Slot 18 may lead from a preferably circular hole 20, to prevent slot 18 from extending further into the bag or the pouring spout to be servered, by inadventently cutting too far along the line of perforations 17. A slot 21 may extend within the longitudinal heat seal section 16, or may be spaced slightly therefrom on the side opposite the adjacent edge 9 of the strip, as shown, so as to permit the filling spout 11 more conveniently to be folded over and sealed or closed by a suitable device after the bag has been filled. The slot 21 conveniently extends from the line of perforations 17 and, if desired, may be J-shaped, i.e. having a hook at the lower end, or may terminate in a hole, both forms of which are shown in U.S. Patent 2,990,101.

To seal the top of the bag B, except along filling spout 11, a heat seal section 22 may extend from the lower end of heat seal 16 and diagonally across the strip, so as to clear the slots 18 and 19 and conveniently in a curve, such as shown, to reduce the number of or eliminate sharp corners in the heat sealing units. As will be evident, when the bag B of FIG. 2 is separated from the strip, i.e. by completing servering along perforations 17 and slots 18 and 19, the upper edge, except for filling spout 11, will be closed by the heat seal sections 16 and 22, while the opposite corner of the upper edge will be provided with a rectangular cut-out with a small arc 23 at the then upper right corner, occasioned by separating the bag from the next bag along perforations 17 and slots 18 and 19, arc 23 being a portion of the edge of hole 20. At the bottom, the bag will be sealed by heat seals 13, 14 and 15, with the pouring spout 12 extending longitudinally therefrom and an arc 24, also resulting from hole 20, being at the point of connection between pouring spout 12 and the remainder of the bottom of the bag.

A series of bags B may be formed in strip S by moving the strip intermittently between a pair of heating dies which produce the heat seals 13, 14, 15, 16 and 22 at spaced positions along the strip, then between a pair of cutting dies which produce the perforations 17 and slots 19, the slits 21 and 18, and the hole 20. This may be accomplished in a manner similar to that shown in U.S. Patent 2,990,101. Or, the strip S may be moved continuously between a pair of rolls having heating dies thereon adapted to produce the desired heat seals at spaced positions, then a pair of rolls which are provided with cutting knives or the like, adapted to produce the desired perforations and slits, such as apparatus of our application Serial No. 810,470, filed May 1, 1959 and entitled "Apparatus for Making Bags," now U.S. Patent 2,999,533, dated September 12, 1961.

As will be evident, the normally open filling spout 11 may be opened to receive a supply of liquid, such as milk, then heat sealed across the top or turned down onto itself and clamped, or closed in any other suitable manner. The bag B may also be placed in a carton formed of cardboard and the like, for reinforcement purposes and for greater ease in handling and shipping. Such a carton should have access holes or flaps for the filling spout 11 and pouring spout 12. As will also be evident, the normally closed pouring spout 12 may be very readily inserted into a control valve or the like, when the bag is to be used for dispensing purposes, and flow therethrough permitted by cutting off the end of the pouring spout, such as along dash line 25.

An alternative bag B' of this invention may be constructed as shown in FIG. 3 and may be formed from a strip in a manner similar to that described above. The strip from which bag B' is made is provided with front and rear walls connected together at the edges, which may be heat sealed and severed in spaced positions along the strip, forming a series of bags. Bag B' has an upwardly extending filling spout 30, located at the upper end, and a downwardly extending pouring spout 31 located at the lower end, both the filling and pouring spouts being positioned centrally or at least between the edges of the bag. The filling spout 30 is normally closed by a central transverse heat seal 32, connected at opposite ends with downwardly extending heat seal sections 33 and 34, respectively, which in turn merge with transversely and outwardly extending heat seal sections 35 and 36, respectively, which complete the top of the bag. Conveniently, heat seal sections 33 and 34 merge with sections 35 and 36, respectively, which complete the top of the bag. Conveniently, heat seal sections 33 and 34 merge with sections 35 and 36, respectively along a curve or arc, while sections 35 and 36 terminate at the edge of the bag in a curved, downturned end. A J-shaped slot 37 may extend within the heat seal sections 33 and 35, or may be spaced slightly therefrom on the outside, as shown, while another J-shaped slot 38 may extend within the heat seal sections 34 and 36, or may be spaced slightly therefrom on the outside, as shown, to permit the filling spout 30 more conveniently to be sealed in a suitable manner after the bag has been filled. Advantageously, slots 37 and 38 each terminate in a hole 39, to prevent tearing. For sanitary reasons, filling spout 30 may remain closed until just prior to filling, at which time the filling spout 30 may be opened by severing, as along dash line 40.

Pouring spout 31 may be smaller than the filling spout, if desired, and is normally closed by a transverse, central heat seal 41. The elongated neck of the pouring spout is formed by a pair of laterally spaced, longitudinal heat seal sections 42 and 43, which extend upwardly from the ends of heat seal 41 and are integral with generally diagonal, outwardly extending heat seal sections 44 and 45, respectively. To accommodate the generally cylindrical shape which the bag B tends to assume when filled with a liquid, such as milk, the juncture between heat seals 42 and 44, as well as between heat seals 43 and 45, is curved, as shown, while heat seals 44 and 45 preferably terminate at the edges of the bag in curved, upturned ends. Thus, heat seals 42, 44 and 43, 45 form the bottom of the bag and provide a pouring spout which is wider at the upper end than at the lower, so that the liquid within the container, which exerts forces normal to the surface of the container, will tend to hold the spout open and prevent binding, so that the liquid will flow freely.

Slots 46 and 47 may extend within heat seals 42 and 43, respectively, or extend on the outside thereof, as shown, so that the remainder of the strip may be folded away from the pouring spout when the spout is inserted into a control valve, when the bag is used for dispensing purposes. Slots 46 and 47 may each terminate in a hole 48 to prevent the slits from tearing further into the bag or pouring spout. Conveniently, after the pouring spout has been inserted into a control valve, the end may be cut off, as along dash line 49, to permit the liquid to flow from the bag.

A still further alternative bag B'' of this invention is shown in FIG. 4. Advantageously, this bag may be made either from a tubular strip, as in the previous embodiments, or from two strips of flat material sealed together along the edges of the bag. In either event, the excess material of the strip is preferably cut away, or the flat sheets are trimmed to shape before or during heat sealing. Bag B'' includes a central filling spout 50 at the upper end thereof and a laterally offset pouring spout 51 at the lower end, although it will be understood that the lateral position of either or both spouts may be varied to suit the use for which the bag is intended. The bag B'', including the filling and pouring spouts, is formed by a single heat seal which extends around the periphery of the bag, as shown, including side edge heat seal sections 52 and 53; heat seal sections 32', 33', 34', 35' and 36', adapted to form the filling spout 50 and similar to the corresponding heat seal sections of bag B' of FIG. 3; and heat seal sections 41', 42', and 43', adapted to form the neck of the pouring spout 51 and again similar to the corresponding heat seal sections of bag B' of FIG. 3. In addition, a longer slanting heat seal section 54 extends between sections 52 and 42', the juncture between the respective sections being curved, conveniently such as shown; and a short slanting heat seal section 55 extends between sections 53 and 43', the juncture between the respective sections again being curved, conveniently such as shown. If a tubular strip is used, the front and rear walls thereof will be sealed together along the heat seal sections, while if two separate strips are used, they will be joined together along the heat seal sections.

Advantageously, the bag B'' may be separated from the tubular strips or the two separate strips, as the case may be, by a hot wire which is bent to the shape of the bag and may be incorporated with the heat sealing iron, along the outer periphery thereof. Thus, the bag may be formed and separated from the strips in one operation. Conveniently, the strips may be moved along a conveyor in overlying position and the sealing iron, which is in the shape of the heat seal sections of the bag, may be brought into contact with the strips, at timed intervals, sealing them together. At the same time, the hot wire which forms the periphery of the sealing iron will sever the strips to separate the bag from the remainder of the strips.

To fill the bag B'', the filling spout 50 may be severed, as along dash line 56 and the spout pulled open by grasping tabs 57, each also formed of heat sealable material which is doubled over and attached to opposite sides of the spout, as in FIG. 5, by heat sealing. The filling spout 50 may then be sealed or closed in any suitable manner after the bag has been filled. As will be evident, pouring spout 51 may be readily inserted into a control valve or the like, when the bag is to be used for dispensing purposes, and flow therethrough may be permitted by removing the transverse heat seal section 41', which initially forms the end of the pouring spout, as by cutting along dash line 58.

As will be evident, the bags of this invention may be produced individually, instead of in strip form, while various forms of this invention may be produced in strip form by the apparatus disclosed and claimed in our aforesaid application Serial No. 810,470, now U.S. Patent 2,999,533. Although the term "heat seal" is used herein to refer to the attachment of the front and rear walls of a strip, or to attach separate strips together, it will be understood that the term includes a heat weld in which the material of two walls of the strip itself, or of separate strips, are fused, as well as a connection formed by heating a layer of perhaps different material to form a connection. In addition, it will be understood that various features of one embodiment of this invention may be incorporated in other embodiments and that the position of the filling and pouring spouts, as well as the relative sizes thereof, may be varied to suit the purpose for which the bag is intended. For example, slit 21 may be produced closer to heat seal 16 and extend along heat seal 22, so as to eliminate completely the unusable flap or portion of bag B above heat seal 22 and to the right of heat seal 16, as viewed in FIG. 2. Also, the filling spout 11 may be formed with a heat seal across the upper end thereof, if desired, this heat seal being severed from the bag at the time of filling.

From the foregoing, it will be evident that this invention fulfills to a marked degree the requirements and objects hereinbefore set forth. A bag constructed in accordance with this invention is readily filled at the top through a filling spout and emptied at the bottom through a pouring spout. The bag may be made of sufficiently inexpensive material that it may be discarded after one use, thus avoiding the transportation difficulties and inconvenience of sterilization inherent in metal containers. The bag is also readily and relatively inexpensively manufactured, since a flattened tubular strip of heat sealable material, or individual strips thereof, may be purchased at a reasonable cost, while heat sealing and cutting to form the bags may be performed on a production basis, thus further reducing the cost thereof. By making a plurality of bags from a single tubular strip and leaving the bags attached together, a roll of bags is produced which may not only be handled readily, but also may be more readily protected from contamination. By providing serrations or cuts along a line which extends across a heat sealed area or adjacent thereto, a filling spout may be easily provided and may be disposed at one edge of the bag, as in FIG. 2, or between the edges of the bag, as in FIGS. 3 and 4, and easily separated from the rest of the bag. Also, the bag may be made from two separate strips, as in FIG. 4, which are heat sealed together along a line forming the outer edges of the bag. The bag may also be provided with tabs, heat sealed to opposite sides of the filling spout, so that it may easily be opened for filling. The filling spout, after that bag is filled, may also be readily closed. By producing suitable heat sealed areas at appropriate positions, a pouring spout may be provided at the lower end of the bag, the end of which will remain sealed until the contents of the bag are to be discharged.

The pouring spout, as well as the filling spout or portion, may be separated from the remainder of the upper and lower portions of the bag, as by slots which may be J-shaped, and may terminate in holes, so that a lateral pull on either the pouring or filling spout will not tend to cause the slot to tear into the remainder of the bag.

Although certain preferred embodiments of this invention have been illustrated and described, it will be understood that other embodiments may exist and various changes may be made therein, all without departing from the spirit and scope of this invention.

What is claimed is:

1. A bag for milk and the like, comprising front and rear walls attached together at the side edges and formed of a flexible, heat sealable plastic material; a heat seal extending from one edge and generally across a lower portion of said bag to a first generally downwardly extending heat seal; a heat seal extending from the opposite edge and generally across a lower portion of said bag to a second generally downwardly extending heat seal, said first and second downwardly extending heat seals being spaced apart; a heat seal extending between the lower ends of said first and second downwardly extending heat seals, said former heat seals forming a pouring spout upon severance of said bag adjacent said latter heat seal; a transverse heat seal extending across a limited portion of the top of the bag; and a heat seal extending downwardly from each end of said top heat seal, then outwardly to the respective edges of said bag, thereby forming a filling spout upon severance of said bag adjacent said transverse heat seal.

2. A bag for milk and the like, comprising front and rear walls attached together at the side edges and formed of a flexible heat sealable plastic material; a filling spout formed by a portion of one end of said bag, a first generally longitudinal heat seal extending to said one end of said bag at one side of said end portion, first generally longitudinally extending means joining said front and rear walls of said bag and extending to said one end at the opposite side of said end portion, and a generally transverse heat seal extending from said first longitudinal heat seal to the edge of said bag opposite said first generally longitudinally extending means; a pouring spout formed by a sealed portion at the other end of said bag, a second generally longitudinal heat seal extending to said other end of said bag at one side of said sealed portion, and second generally longitudinally extending means joining said front and rear walls of said bag and extending to said other end at the opposite side of said sealed portion; and a slit extending from said one end of said bag and substantially coinciding with said first generally longitudinal heat seal and separating said filling spout from the remainder of said bag.

3. A bag for milk and the like, comprising front and rear walls attached together at the side edges and formed of a flexible heat sealable plastic material; a filling spout formed by an unsealed portion of the top of said bag adjacent one side edge thereof and a heat seal extending downwardly from said unsealed portion opposite said one edge and then generally laterally across said bag to the other edge; a pouring spout at the bottom of said bag formed by said other side edge of said bag and a heat seal extending inwardly from said other side edge a distance equal to the width of said pouring spout, then upwardly, generally parallel to said other edge a distance equal to the length of said pouring spout and then generally laterally across said bag to said one side edge; and a slit, extending from the top of said bag and substantially coinciding with said downwardly extending heat seal and separating said filling spout from the remainder of said bag.

4. A bag for milk and the like as defined in claim 3, wherein said filling spout is wider than said pouring spout.

5. A series of bags for milk and the like, comprising a flattened tubular strip formed of heat sealable, plastic material and adapted to be placed in roll form, with individual bags being adapted to be separated from said strip; a series of heat seals at spaced positions along said strip corresponding to the length of a bag, including a heat seal extending transversely across said strip from one edge to a point adjacent but spaced from the opposite edge, then generally parallel to said opposite edge and then transversely and to said opposite edge; a series of generally round holes in said strip disposed at the inner corner of each of said first mentioned transverse and longitudinal portions of said heat seals; a first series of slots, each extending from said generally round hole alongside and in spaced relation to a longitudinal portion and provided with an angular extension adjacent the point of juncture between said longitudinal and second transverse heat seal portions; a second series of slots, each extending transversely from said opposite edge of said strip and inwardly opposite but terminating short of said angular extension of a first slot; a series of apertures, each extending transversely across said strip from said one edge of said strip and to said generally round hole; a second series of heat seals, each extending longitudinally from said transverse series of apertures, on the side opposite said first transverse heat seal portion, in spaced relation to said one edge of said strip, then generally diagonally across said strip and to the opposite edge of said strip, said generally diagonal portion of each said heat seal being curved and passing around the end extension of a longitudinal slot; and a third series of slots, each extending alongside a longitudinal portion of a second heat seal and on the side opposite said one edge of said strip.

6. A bag for milk and the like, comprising front and rear walls attached together at the side edges and formed of a flexible, heat sealable, plastic material; upper heat seal means extending downwardly from a point spaced from one edge at the top of said bag and generally across the upper portion of said bag to the opposite edge, the top of said bag between said point and said one edge being unsealed to provide a filling spout; lower generally horizontal heat seal means forming the bottom of said bag and extending from one side edge to a point spaced from the other side edge; a downwardly extending heat seal from said spaced point generally parallel to said other side edge forming a pouring spout extending below the bottom of said bag; and a heat seal closing the end of said pouring spout and adapted to be severed to form a discharge means for said pouring spout.

7. A bag for milk and the like, as defined in claim 6, including a heat seal extending across the upper end of said filling spout adapted to be severed before filling.

8. A bag for milk and the like, as defined in claim 6, wherein said filling spout is wider than said pouring spout.

References Cited by the Examiner
UNITED STATES PATENTS

| | | |
|---|---|---|
| 2,665,033 | 1/54 | Robertson. |
| 2,831,610 | 4/58 | Dennie. |
| 2,866,488 | 12/58 | Thompson. |
| 3,009,498 | 11/61 | Fohr. |

FRANKLIN T. GARRETT, *Primary Examiner.*